United States Patent [19]

Ohkawa et al.

[11] 4,263,096
[45] Apr. 21, 1981

[54] TOROIDAL MAGNET SYSTEM

[75] Inventors: Tihiro Ohkawa, La Jolla, Calif.;
Charles C. Baker, Naperville, Ill.

[73] Assignee: The United States of America as represented by the United States Department of Energy, Washington, D.C.

[21] Appl. No.: 864,696

[22] Filed: Dec. 27, 1977

Related U.S. Application Data

[63] Continuation-in-part of Ser. No. 654,037, Feb. 2, 1976, abandoned.

[51] Int. Cl.² .................................................. G21B 1/00
[52] U.S. Cl. .......................................... 176/3; 335/216; 335/296; 336/225; 336/229
[58] Field of Search .......................................... 176/1–9; 335/213, 216, 296, 298; 336/223, 225, 228, 229

[56] References Cited

U.S. PATENT DOCUMENTS

| 3,736,539 | 5/1973 | File et al. | 176/3 |
| 3,778,343 | 11/1973 | Coppi et al. | 176/3 |

Primary Examiner—Harvey E. Behrend

[57] ABSTRACT

In a plasma device having a toroidal plasma containment vessel, a toroidal field-generating coil system includes fixed linking coils each formed of first and second sections with the first section passing through a central opening through the containment vessel and the second section completing the linking coil to link the containment vessel. A plurality of removable unlinked coils are each formed of first and second C-shaped sections joined to each other at their open ends with their bights spaced apart. The second C-shaped section of each movable coil is removably mounted adjacent the second section of a linking coil, with the containment vessel disposed between the open ends of the first and second C-shaped sections. Electric current is passed through the linking and removable coils in opposite sense in the respective adjacent second sections to produce a net toroidal field.

4 Claims, 3 Drawing Figures

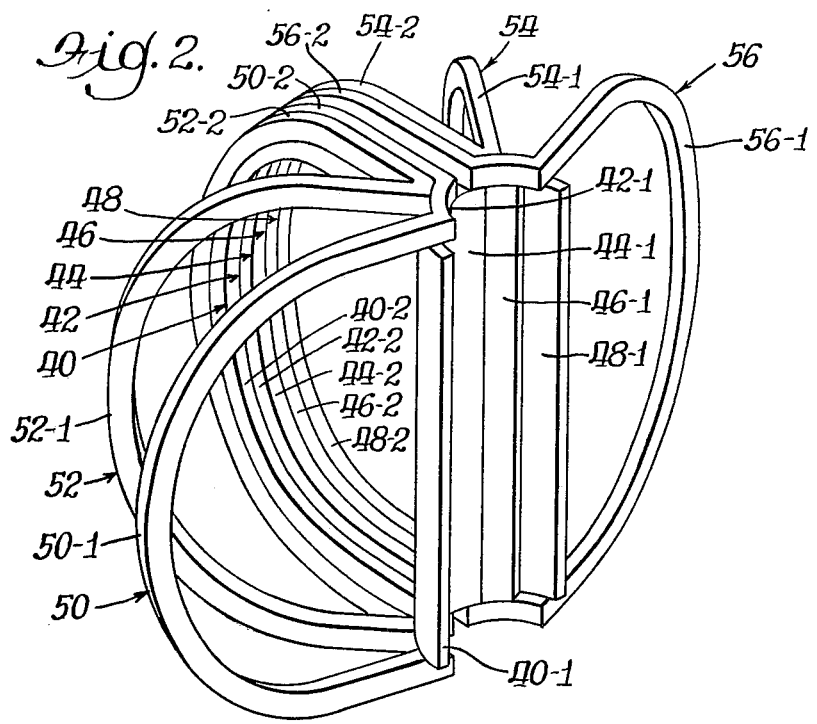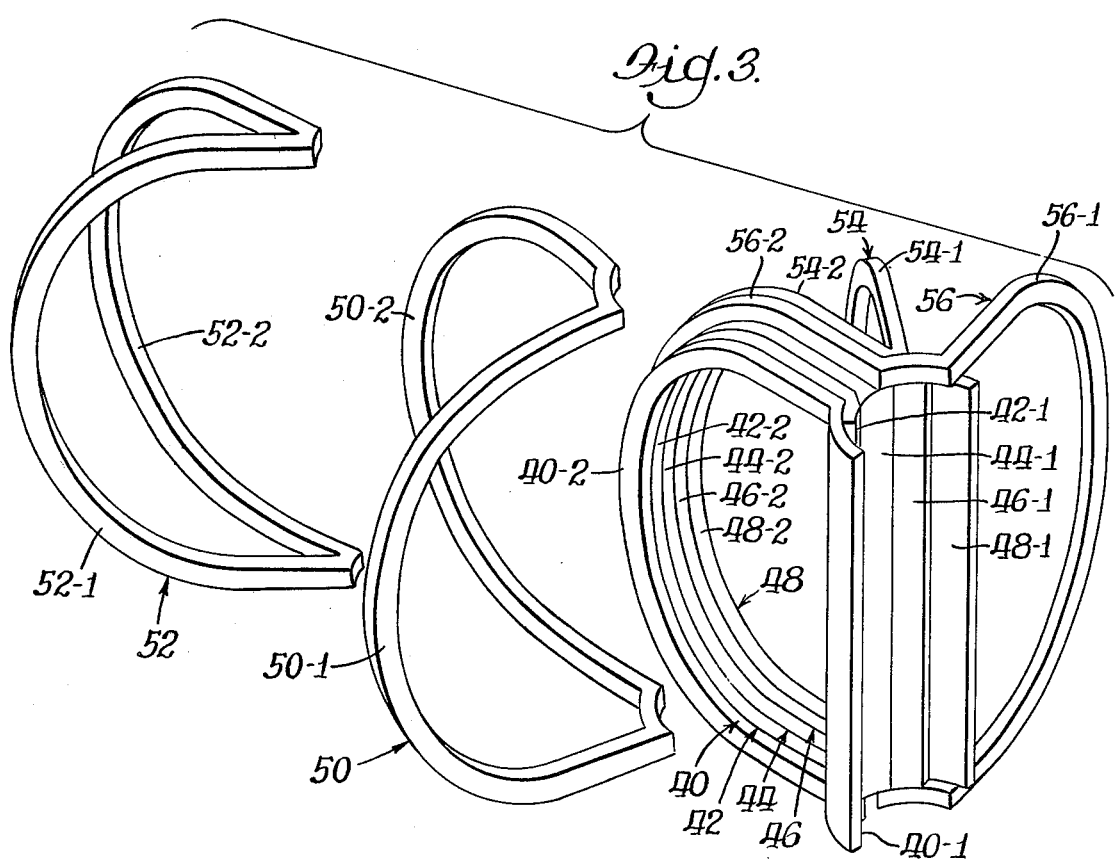

TOROIDAL MAGNET SYSTEM

This application is a continuation-in-part of copending application Ser. No. 654,037, filed Feb. 2, 1976 now abandoned.

This invention relates generally to devices which utilize a toroidal magnetic field and more particularly to toroidal coil systems with demountable toroidal coil elements disposed about a toroidal containment vessel.

One of the more challenging problems in the design of toroidal plasma devices is the development of suitable assembly/disassembly and maintenance methods. The fact that the toroidal field coils of such a device link a toroidal plasma containment vessel makes access to the interior of the device very difficult. The present invention finds particular utility in experimental devices and the use thereof in experimentation and investigation in respect to toroidal plasma devices like those of the tokamak type.

In some devices, poloidal coils are located inside the toroidal coils. In such cases, assembly has been performed by winding the poloidal coils in place or by employing demountable toroidal coils. This presents some difficult manufacturing and maintenance problems. In addition, for devices employing superconducting toroidal coils, demountable joints would be very difficult if not impossible. In any event, a high incentive exists to develop toroidal coil concepts which allow easy access to the envelope formed by such coils.

There are at present two basic approaches for providing access through the toroidal coils. One is to remove an entire sector of the device, including a portion of the toroidal coil system. This involves severing the toroidal plasma containment vessel, moving massive sections of the assembled magnets, and breaking hundreds of connections. The other approach is to make the magnet very large in order to provide access between coils. Large coils are required when their number is reduced in order to maintain an acceptable field ripple at the plasma surface. Unfortunately, this implies poor utilization of the available magnetic volume.

In accordance with the present invention, a toroidal coil system is provided which utilizes two different types of coils; one in which field generating coils link the toroidal containment vessel and one in which field correcting coils do not link any component of the device. The unlinked coils can be easily pulled back from the device, providing much improved access.

Consider first the field generating coils which link the plasma containment vessel and other components of the device. They can be of arbitrary shape, such as circular or D-shaped. The total ampere-turns $(NI)_L$ of these coils is given by $$(NI)_L = \frac{2\pi R_o B_o}{\mu_o}, \quad (1)$$

where $R_o$ is the major radius of the torus, $B_o$ is the magnetic field at $R_o$, and $\mu_o$ is the permeability of free space. One configuration for maximizing access is to employ two large fixed return legs each carrying $\frac{1}{2}(NI)_L$ ampere-turns. This structure is relatively fixed about the vessel.

This arrangement provides convenient access to the toroidal containment vessel, but unfortunately a large field ripple will result. To reduce the large field ripple, current in the opposite direction is provided to cancel partially the current around the outside of the toroidal containment vessel in the large return legs of the linking coils. This is accomplished by the field correcting unlinked coils.

The unlinked coils have two C-shaped sections or legs joined at their open ends. One leg overlaps the outer sections of the linking coils and carries current in the direction opposite to that in the outer sections of the linking coils. The other section or leg is placed at a different azimuthal position. The azimuthal angle between the bights of the two C-shaped sections will be multiples of 360°/N where N is the total number of coils in a conventional magnet design which are required to obtain a given field ripple.

These C-shaped coils can be relatively easily moved into place around the torus, and removed for maintenance, for they do not link the toroidal vessel. When clustered in position around the torus, the configuration will resemble the usual magnet configuration. The exact location of the return legs will be chosen to obtain the desired cancellation of the effect of the field ripple in the plasma region.

Therefore, it is a primary object of the invention to provide a demountable coil system for a toroidal device for ready access and maintenance. A further object is to provide a toroidal coil system for such devices wherein field generating coils at a few locations link a toroidal containment vessel, with smoothing of the toroidal field provided by removably mounted coils not linking the vessel.

Other objects and advantages of the invention will become apparent from the following detailed description, particularly when taken with the appended drawings, in which:

FIG. 2 is an isometric view of a preferred toroidal coil arrangement, according to the present invention, as assembled in the device shown in FIG. 1; and FIG. 3 is an isometric view of the coils shown in FIG. 2 in partly disassembled condition.

Figure 1:
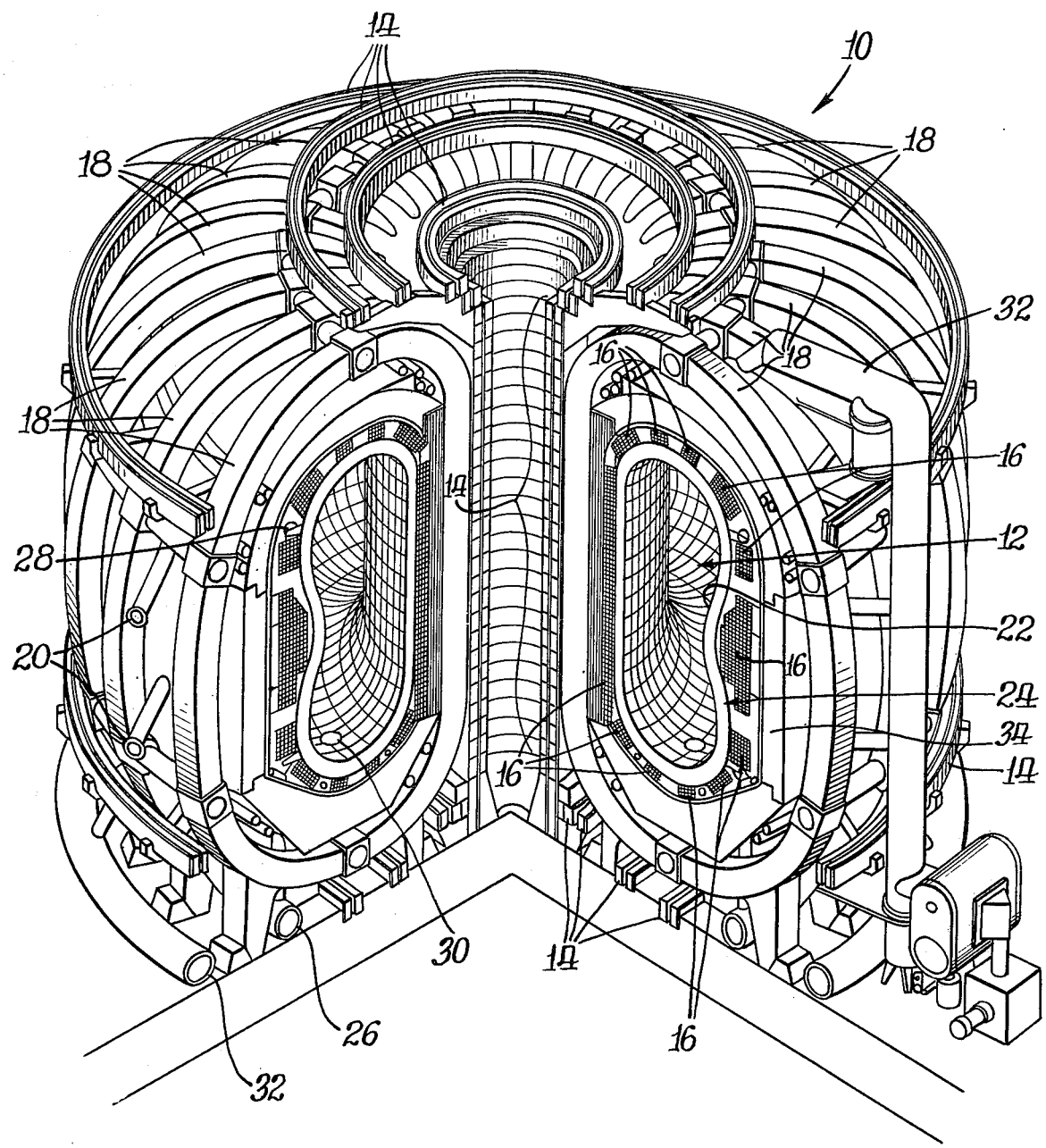
FIG. 1 is an isometric view of a plasma device in which the present invention may be utilized, with a section cut away to illustrate the internal construction of the device.

FIG. 1 illustrates a toroidal plasma device 10. The device includes a large toroidal containment vessel 12 containing and confining gas. The containment vessel 12 may be more than 6 meters high, with a shape and other relative dimensions as shown in the drawings. The plasma is created by a poloidal field, established by E-coils 14. When the E-coils 14 are energized, they produce a time varying magnetic flux linking the vessel 12. The electric field induced by this flux variation initiates and maintains the toroidal discharge current required for plasma confinement and ohmic heating. F-coils 16 control the magnetic configuration of the discharge, confining it generally to the shape, position and dimensions of the vessel 12. The F-coil system establishes the magnetic boundary conditions for the plasma. It is essentially a passive system with energy being added to overcome resistive losses in the F-coils. Around the vessel 12 are toroidal B-coils 18, which establish an azimuthal magnetic field for stable plasma confinement.

To achieve the required plasma temperature, auxiliary neutral beam heating may be provided in addition to the ohmic heating provided by the E-coils 14. To this end, high energy neutral particles may be injected tangentially into the vessel 12 through injection ports 20. The operation of the described coils, together with the neutral beam heating, produces a plasma of ions magnetically confined in the vessel 12. The magnetic confinement maintains the plasma sufficiently out of contact with the first wall 22 forming the inner wall of the vessel 12 so that the plasma is not cooled to destruction by the first wall 22.

A blanket 24 surrounds the vessel 12. Coolant gas is circulated through the blanket 24 from a conduit 26. Cool gas is introduced into the conduit 26, and heated gas is withdrawn from a conduit 28.

In order that the plasma may be generated at relatively low pressures, the vessel 12 is constantly pumped out by vacuum pumps through ports 30 and conduits 32.

A radiation shield 34 limits the escape of harmful radiation.

As is evident from FIG. 1, it is easy enough to remove the outer E-coils 14, as by raising or lowering them to get them out of the way. The B-coils 18 are another matter. As is also evident from FIG. 1, the B-coils 18 impede access to the containment vessel 12. Access is facilitated by the toroidal coil system of the present invention, a preferred embodiment of which is illustrated in FIGS. 2 and 3 which illustrate generally one half of the coils 18 of a toroidal coil system according to the present invention.

The coils 18 are comprised of the composite of linking coils 40, 42, 44, 46 and 48 and unlinked coils 50, 52, 54 and 56. The linking coils are formed of first sections or legs 40-1, 42-1, 44-1, 46-1 and 48-1, respectively, which pass through the open central portion of the containment vessel 12 and second sections or legs 40-2, 42-2, 44-2, 46-2 and 48-2 which complete the respective linking coils to link the containment vessel. The unlinked coils are formed of first C-shaped sections or legs 50-1, 52-1, 54-1 and 56-1, respectively, and second C-shaped sections or legs 50-2 52-2, 54-2 and 56-2 joined to respective first C-shaped sections at their open ends with their bights spaced apart.

The linking coils 40, 42, 44, 46 and 48 are relatively fixedly disposed to link the reaction vessel 12 with the first sections 40-1, 42-1, 44-1, 46-1 and 48-1 distributed substantially evenly around the central opening of the vessel and with the second sections 40-2, 42-2, 46-2 and 48-2 grouped together at a single azimuthal position. A corresponding group of linking coils is included in the other half of the toroidal coil system, providing two groups of linking coils 180° apart.

The unlinked coils 50, 52, 54 and 56 are movable. They are removably mounted in the device 10 with the respective second sections 50-2, 52-2, 54-2 and 56-2 closely adjacent respective second sections of the linking coils, with the vessel 12 disposed between the open ends of the respective first and second C-shaped sections. The bights of the respective coils are spaced from one another around the periphery of the vessel 12 by approximately multiples of 360°/N where N is the effective number of coils, 10 in the embodiment shown in FIGS. 2 and 3. Thus, the bights of the second coil sections 52-2 and 54-2 are spaced from the bights of first coil sections 52-1 and 54-1, respectively, by about 36°, and the bights of second coil sections 50-2 and 56-2 are spaced from the bights of first coil sections 50-1 and 56-1 by about 72°. In this way, the first sections of the movable, unlinked coils are substantially evenly distributed about the periphery of the vessel between the positions of the first sections of the linking coils.

Current is applied to the fixed linking and movable unlinked coils from the usual power supplies, with current being passed in the opposite sense in adjacent second sections of linking and movable coils so that their respective magnetic fields offset one another. The number of turns and current magnitude in respective coils are made such as to make the magnetic field strength at the location of the second sections of the linking coils approximately the same as at the first sections of the movable coils, thus providing a uniform toroidal magnetic field with a relatively small ripple. In the embodiment illustrated, all linking and unlinked coils are provided with substantially the same number of turns and substantially the same current is applied, so that the magnetic field occasioned by second sections 50-2, 52-2, 54-2 and 56-2 of the unlinked coils substantially neutralizes the field occasioned by the adjacent second sections 40-2, 42-2, 46-2 and 48-2 of the linking coils, effectively leaving the field occasioned by second section 44-2 unneutralized. This effectively makes first sections 40-1, 42-1, 46-1 and 48-1 of the linking coils the return path for current in the first sections 50-1, 52-1, 54-1 and 56-1 of the unlinked coils, so that there are effectively five coils linking the vessel 12 evenly distributed over each half of the vessel.

While a particular preferred embodiment of the invention has been shown and described, various modifications can be made within the skill of the art without departing from the scope of the present invention. For example, FIG. 1 illustrates a tokamak plasma device in which the present invention may be utilized. FIG. 1 is intended to illustrate a generalized device, whether or not the B-coils are movable as in the present invention and irrespective of the number of coils. In fact, the number of B-coils in FIG. 1 is not the same as the number of coils in the preferred embodiment of FIGS. 2 and 3, which is effectively a 10 coil system. By the appropriate placing and energizing of linking and unlinked coils according to the present invention, substantially any number of B-coils may be used, as may be desired to achieve a particular field ripple.

It should also be noted that very large repulsive forces may be produced between adjacent legs of unlinked and linking coils, requiring appropriate structural restraints as are conventional for magnetic devices creating such large repulsive forces, such restraints providing the required mechanical strength without interfering adversely with the magnetic and electrical properties of the coils.

What is claimed is:
1. In a device having a toroidal plasma containment vessel with walls confining a toroidal region encircling a central opening through the vessel,
    a toroidal coil system for producing a toroidal magnetic field in the vessel, said toroidal coil system comprising
    fixed field generating linking coil means comprising at least one linking coil disposed in fixed relation to said vessel with the coil linking the vessel, each linking coil being formed of first and second sections with the first section passing through said central opening through the vessel and the second section completing the linking coil to link the vessel,
    a plurality of movable unlinked field correcting coils each formed of first and second C-shaped sections joined to each other at their open ends with their bights spaced apart, means for removably mounting the second C-shaped section of each movable coil adjacent said second section of one of said linking coils, with the plasma containment vessel disposed between the open ends of the respective first and second C-shaped sections, with neither C-shaped section passing through said central opening through the plasma containment vessel to link the vessel, and means for passing electric current through said linking and movable coils in opposite sense in the respective adjacent second sections.

2. A toroidal coil system according to claim 1 wherein with said second C-shaped sections mounted adjacent said second section of a linking coil, said first C-shaped sections are substantially evenly distributed about the periphery of said vessel, and the net magnetic field strength at said adjacent second sections approximates the magnetic field strength at each of said first C-shaped sections when said means for passing electric current is energized.

3. A toroidal coil system according to claim 2 wherein said linking coils are disposed at respective azimuthal positions 180° apart and said sections of said unlinked coils are substantially evenly distributed therebetween.

4. A toroidal coil system according to claim 2 wherein said first sections of said linking coils are substantially evenly distributed around said central opening.

* * * * *